United States Patent [19]
Friedmann

[11] Patent Number: 5,538,481
[45] Date of Patent: Jul. 23, 1996

[54] TORQUE TRANSMITTING APPARATUS

[75] Inventor: Oswald Friedmann, Lichtenau, Germany

[73] Assignee: LuK Getriebe-Systeme GmbH, Bühl/Baden, Germany

[21] Appl. No.: 208,528

[22] Filed: Mar. 9, 1994

[30]     Foreign Application Priority Data

Mar. 13, 1993 [DE]  Germany ............ 43 08 029.4

[51] Int. Cl.$^6$ .................................... F16H 3/46
[52] U.S. Cl. .............. 475/142; 475/299; 475/317; 475/322; 192/18 A
[58] Field of Search ................. 475/140, 142, 475/299, 317, 319, 320, 321, 322; 192/12 R, 18 A, 12 C, 21, 48.3, 48.7

[56]        References Cited

U.S. PATENT DOCUMENTS

| 3,131,582 | 5/1964 | Kelbel .......................... 475/322 |
| 5,024,638 | 6/1991 | Sakakibara et al. ............ 475/319 |

FOREIGN PATENT DOCUMENTS

| 3424856 | 1/1986 | Germany . |
| 3603401 | 8/1987 | Germany ................ 475/319 |
| 4234294 | 4/1993 | Germany . |

Primary Examiner—Rodney H. Bonck
Assistant Examiner—Sherry Estremsky
Attorney, Agent, or Firm—Darby & Darby

[57]          ABSTRACT

A power train between the engine and the wheels of a motor vehicle has a start-up component which receives torque from the engine and transmits torque to an infinitely variable transmission through a reversible torque transmitting apparatus. The transmitting apparatus comprises at least one planetary transmission, a first clutch which can be engaged to transmit torque from the start-up component and the planet wheel carrier of the planetary transmission to an input/output element, and a second clutch which can be engaged, when the first clutch is disengaged, to connect the internal wheel of the planetary transmission to a housing for the planetary transmission. The first clutch is mounted, at least in part, on the planet wheel carrier and the second clutch is mounted, at least in part, on the internal wheel of the planetary transmission.

55 Claims, 6 Drawing Sheets

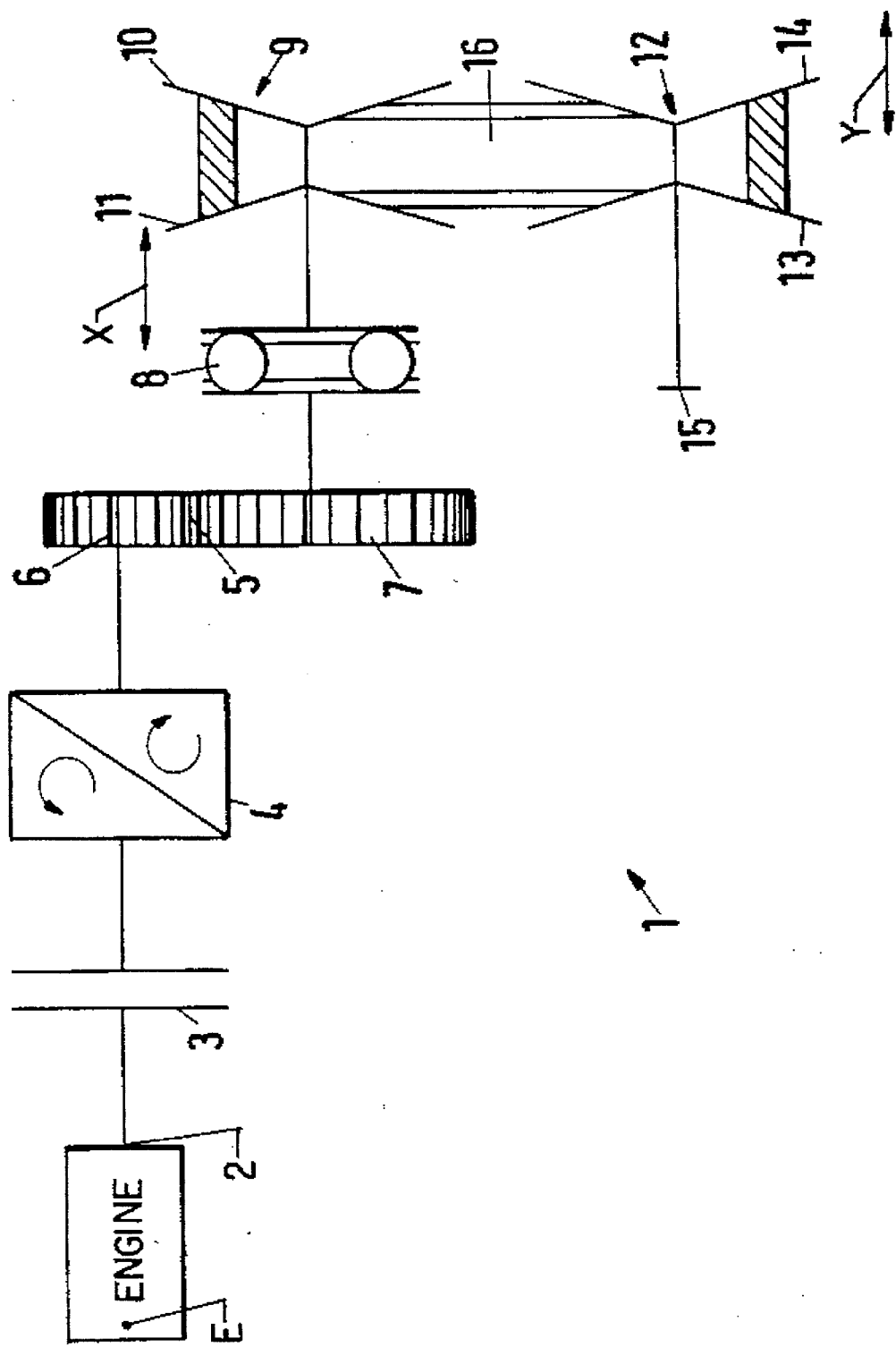

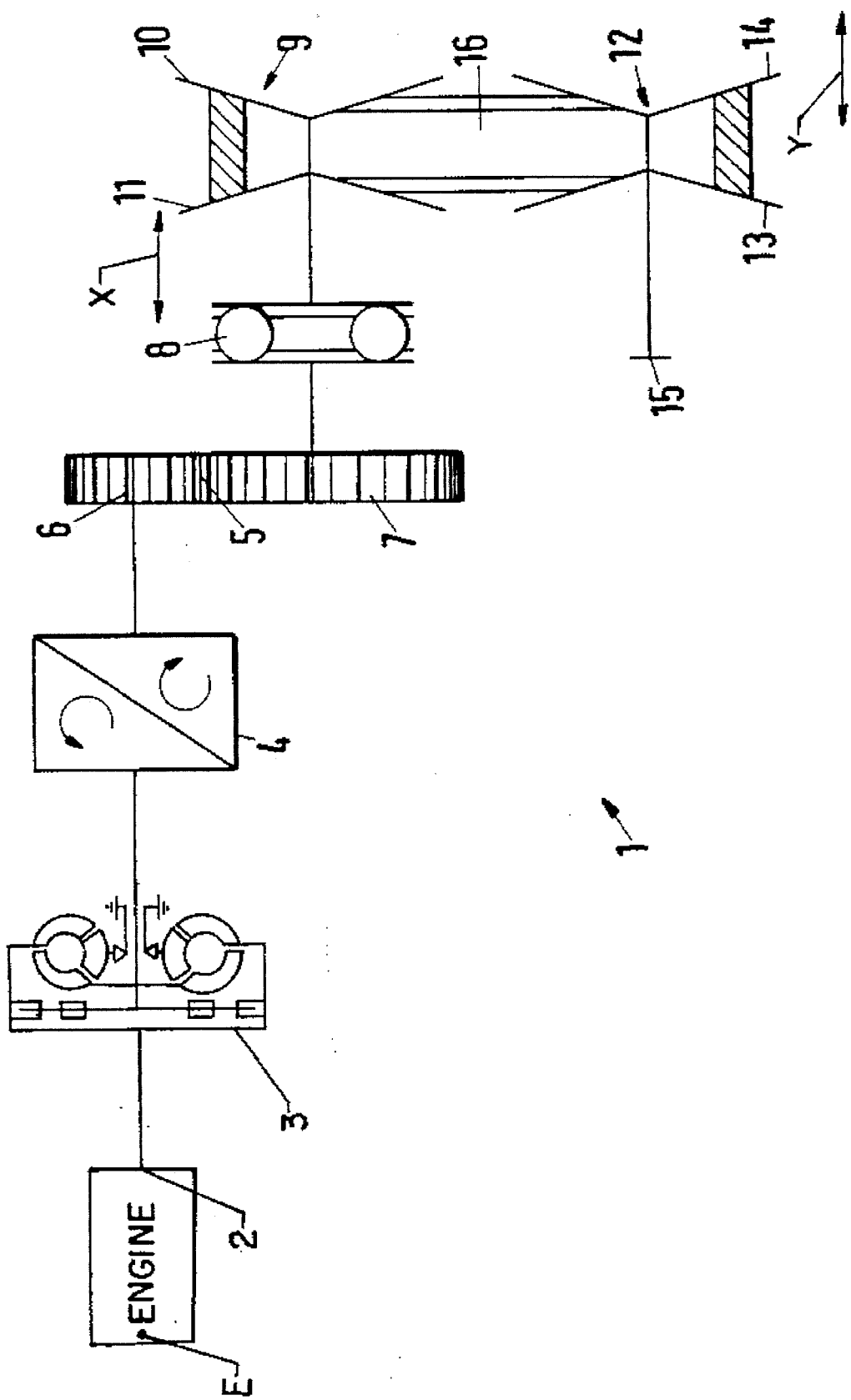

TORQUE TRANSMITTING APPARATUS

BACKGROUND OF THE INVENTION

The present invention relates to improvements in torque transmitting apparatus. More particularly, the invention relates to improvements in torque transmitting apparatus which can be utilized with advantage in the power trains between the engines and the wheels of motor vehicles. Still more particularly, the invention relates to improvements in reversible torque transmitting apparatus which can be utilized between the output elements of engines and the differentials of motor vehicles.

It is already known to utilize in motor vehicles reversible torque transmitting apparatus which employ planetary transmissions of the type having a sun gear or wheel, an internal gear or wheel, a rotary planet wheel carrier, and one or more planet pinions or wheels rotatably mounted on the carrier and mating with the sun wheel as well as with the internal gear. Reference may be had, for example, to German Pat. No. 34 24 856 C 2 which discloses a start-up element serving to receive torque from the engine of a motor vehicle and to transmit torque to an input element of a reversible torque transmitting apparatus which employs a twin planetary transmission. The transmission is blocked while the vehicle is being driven in the forward direction. If the vehicle is to be driven rearwardly, the internal wheel of the transmission is braked to prevent rotation relative to the transmission housing, and the transmission then receives or transmits torque by way of its sun wheel. A drawback of the patented apparatus is that, when the vehicle is driven in a forward direction, the force which is to cause a clutch of the patented apparatus to block the planetary transmission, by connecting the planet wheel with the sun wheel, must be applied to a rotating shaft. This can be achieved by resorting, for example, to an antifriction ball or roller bearing or by resorting to a hydraulic rotary transmission. In either event, the patented apparatus operates with loss of power due to the development of drag torque. This results in a drop of the efficiency of the entire power train and contributes to higher fuel requirements of the engine of the motor vehicle. In addition, presently known reversible torque transmitting apparatus are rather bulky, expensive and prone to malfunction.

OBJECTS OF THE INVENTION

An object of the invention is to provide a torque transmitting apparatus which is simpler and more reliable than heretofore known apparatus.

Another object of the invention is to provide a reversible torque transmitting apparatus which can be utilized in the power trains of motor vehicles to increase the efficiency and reduce the energy requirements of the engines of such vehicles.

A further object of the invention is to provide an apparatus which can be operated by simple, compact and inexpensive. actuating means for its adjustable components.

An additional object of the invention is to provide an apparatus which can be readily installed in the power trains of existing vehicles as well as in the power trains of new vehicles.

Still another object of the invention is to provide novel and improved combinations of planetaries and clutches for use in the above outlined torque transmitting apparatus.

A further object of the invention is to provide novel and improved clutches and combinations of clutches for use in the above outlined apparatus.

Another object of the invention is to provide a novel and improved method of assembling certain constituents of the above outlined apparatus.

An additional object of the invention is to provide novel and improved combinations of the above outlined novel reversible torque transmitting apparatus with start-up clutches and variable speed transmissions of motor vehicles.

Still another object of the invention is to provide a reversible torque transmitting apparatus which can employ a simple, compact and inexpensive but highly reliable planetary transmission.

A further object of the invention is to provide a novel and improved friction clutch for use in the above outlined apparatus.

Another object of the invention is to provide a novel and improved multiple-disc clutch for use in the above outlined apparatus.

An additional object of the invention is to provide a novel and improved method of transmitting torque from the engine to the front and/or rear wheels of a road vehicle.

Still another object of the invention is to provide a power train which embodies the above outlined apparatus.

A further object of the invention is to provide a motor vehicle which embodies the above outlined reversible torque transmitting apparatus.

SUMMARY OF THE INVENTION

One feature of the present invention resides in the provision of preferably reversible torque transmitting apparatus which comprises at least one planetary transmission (hereinafter called planetary) including a rotary sun gear or wheel (hereinafter called sun wheel), an internal gear or wheel (hereinafter called internal wheel) which is coaxial with the sun wheel, at least one planetary gear or wheel (hereinafter called planetary wheel) in mesh with at least one of the parts including the sun wheel and the internal wheel, a rotary planet carrier (hereinafter called carrier) mounting the at least one planetary wheel and being coaxial with the sun wheel, and a rotary input/output element. The improved apparatus further comprises a first clutch, including means for coupling the carrier with the input/output element. The first clutch has engaged and disengaged conditions in which the first clutch respectively transmits torque between the input/output element and the carrier, and permits the input/output element and the carrier to rotate relative to each other. The apparatus also includes means for yieldably biasing the coupling means of the first clutch in the engaged condition, a housing which at least partially surrounds the planetary, and a fluid-operated second clutch including means for coupling the internal wheel with the housing. The coupling means of the second clutch can also assume engaged and disengaged conditions in which the second clutch respectively transmits torque between the internal gear and the housing and permits the internal gear to rotate relative to the housing.

In accordance with a presently preferred embodiment, the housing at least partially surrounds the clutches and the second clutch further includes hydraulically operated means for actuating the coupling means of the second clutch.

The apparatus can further comprise means for maintaining one of the coupling means in the engaged condition when the other coupling means is in the disengaged condition. The aforementioned biasing means can form part of such maintaining means.

The maintaining means can include means for automatically disengaging one of the coupling means in response to engagement of the other coupling means, for example, for automatically disengaging the coupling means of the second clutch in response to engagement of the coupling means of the first clutch.

At least a portion of the first clutch is or can be mounted on the carrier of the planetary, and at least a portion of the second clutch is or can be mounted on the internal wheel of the planetary.

At least one of the clutches (e.g., the first clutch) can constitute or include a disc clutch, e.g., a multiple-disc clutch.

The second clutch can constitute or include a friction clutch, and the coupling means of the second clutch can include two substantially disc-shaped members and a friction lining on at least one of the disc-shaped members. The two members can be coaxial with the sun wheel, and at least one of these members is preferably movable relative to the other member, at least in the direction of the common axis of the two members. The biasing means can be disposed between the two members (as seen in the direction of the common axis of the first and second members), and the biasing means can comprise at least one diaphragm spring.

One of the members (e.g., the first member) can include means for transmitting bias from the biasing means to the coupling means of the first clutch, and the transmitting means can include a radially inner portion of the one member.

The apparatus can also comprise means for axially movably and nonrotatably securing at least one of the members to the internal wheel.

The two substantially disc-shaped members, the biasing means and the internal wheel can form part of, or can constitute, an assembly or module which is movable relative to the housing in the direction of the common axis of the two members.

The internal wheel of the planetary can be mounted for movement between two end positions in the direction of the common axis of the sun wheel and the internal wheel. Such apparatus can further include means for at least substantially centering the internal wheel relative to the sun wheel in at least one of the two end positions of the internal wheel. The centering means can be designed to engage an external surface of the internal wheel, at least in the one end position of the internal wheel. The external surface can include a conical portion which is engaged by the centering means in the one end position of the internal wheel. A portion of the centering means can be provided on the carrier of the planetary, and such portion of the centering means can be of one piece with the carrier. The just mentioned portion of the centering means can include a centering surface on the carrier.

In accordance with a presently preferred embodiment, the centering means comprises a centering surface on the carrier and resilient means for urging the internal wheel against such internal surface. The resilient means can comprise one or more diaphragm springs, and such resilient means can be disposed between the two substantially disc-shaped members (as seen in the direction of the common axis of the two members). The arrangement can be such that the resilient means reacts against at least one of the two members and urges the internal wheel against the carrier.

The input/output element of the improved apparatus is rotatable in first and second directions, and the apparatus can further comprise a retainer which is engaged by the resilient means of the centering means, at least while the input/output element rotates in one of the first and second directions. The retainer can be connected with the carrier, and the resilient means is preferably arranged to engage the retainer only while the input/output element rotates in one of two directions. The resilient means of the centering means can be mounted in such a way that it reacts against each of the two members, at least in the direction of the common axis of the members.

The coupling means of the second clutch can include at least one first friction lining, at least one second friction lining which engages the at least one first friction lining in the engaged condition of the coupling means of the second clutch, and resilient means for disengaging the first and second linings from each other in response to engagement of the coupling means of the first clutch.

The first clutch can be disposed at a first radial distance and the second clutch can be disposed at a second radial distance from the axis of the sun wheel. For example, and if the construction of the two clutches is such that the coupling means of the first clutch includes first friction surfaces and the coupling means of the second clutch includes second friction surfaces, the first friction surfaces are disposed at a first radial distance and the second friction surfaces are disposed at a greater second radial distance from the axis of the sun gear.

The improved apparatus further includes actuating means for engaging and disengaging the first and second clutches, and such actuating means can include a common hydraulically-operated cylinder and piston unit. The arrangement can be such that the cylinder and piston unit is disposed at a first radial distance and at least one of the clutches is disposed at a lesser second radial distance from the axis of the sun wheel. The friction surfaces of the coupling means forming part of the second clutch can be disposed at a third radial distance from the axis of the sun wheel, and the third distance can equal or at least approximate the first distance. The cylinder and piston unit can include a cylinder which is rigid with the housing, a piston which is reciprocable in the cylinder between first and second positions, and means for biasing the piston to one of the first and second positions. The biasing means can comprise one or more coil springs.

The input/output element of the improved apparatus is rotatable in first and second directions, and the coupling means of the first clutch is engageable to transmit torque between the input/output element and the carrier to rotate the input/output element in the first direction. Such apparatus can further comprise means for transmitting torque between the carrier and the internal wheel of the planetary while the input/output element is being rotated in the first direction.

The arrangement can be such that the coupling means of the second clutch is engaged when the input/output element is rotated in the first direction. Such apparatus can further comprise means for transmitting torque between the carrier and the sun wheel when the input/output element is rotated in the second direction.

The apparatus is preferably constructed and assembled in such a way that it is devoid of idling positions.

In accordance with a presently preferred embodiment, the improved apparatus can be put to use in the power train of a motor vehicle. The input/output element of such apparatus is rotatable in a first direction to drive the vehicle in a forward direction, and in a second direction to drive the vehicle in a rearward direction. The prime mover of the vehicle drives the internal wheel by way of the carrier.

As mentioned above, the cylinder of the cylinder and piston unit forming part of the actuating means for the coupling means of the first and second clutches can be rigid with the housing, and the piston of such unit is preferably movable in the cylinder in response to admission of oil or another suitable hydraulic fluid into the cylinder by way of the housing.

Another feature of the present invention resides in the provision of a power train which can be used in a motor vehicle and comprises a start-up element, an infinitely variable transmission including two sheaves or pulleys and an endless flexible element trained over the sheaves, at least one output element for transmission of torque to the front and/or rear wheels of the vehicle, and the aforedescribed reversible torque transmitting apparatus which can be installed to transmit torque to the output element by way of the infinitely variable transmission. The reversible torque transmitting apparatus of such power train can comprise at least one planetary including a rotary sun wheel, an internal wheel which is coaxial with the sun wheel, at least one planetary wheel in mesh with at least one of the parts including the sun wheel and the internal wheel, a rotary planet carrier rotatably supporting the at least one planetary wheel and being coaxial with the sun wheel, and a rotary input/output element. The torque transmitting apparatus further comprises a first clutch including means for coupling the carrier with the input/output element and having engaged and disengaged conditions in which the first clutch respectively transmits torque between the input/output element and the carrier and permits the input/output element and the carrier to rotate relative to each other, means for yieldably biasing the coupling means of the first clutch to the engaged condition, a housing which at least partially surrounds the planetary, and a fluid-operated second clutch including means for coupling the internal wheel with the housing. The coupling means of the second clutch can also assume engaged and disengaged conditions in which the second clutch respectively transmits torque between the internal wheel and the housing and permits the internal wheel to rotate relative to the housing.

The start-up element of the improved power train can comprise a friction clutch, e.g., a disc clutch. Alternatively, the start-up element can comprise a hydrodynamic clutch, e.g., a clutch including or constituting a torque converter. The power train can also comprise a lock-up clutch for the hydrodynamic clutch.

A further feature of the invention resides in the provision of a motor vehicle which comprises a start-up element and an infinitely variable speed transmission. The transmission includes two adjustable sheaves or pulleys and an endless flexible element (such as one or more endless chains or belts) trained over the sheaves, at least one rotary output element, and a reversible torque transmitting apparatus.

The torque transmitting apparatus comprises at least one planetary including a rotary sun wheel, an internal wheel which is coaxial with the sun wheel, at least one planet wheel in mesh with at least one of the parts including the sun wheel and the internal wheel, a rotary planet carrier which rotatably supports the at least one planet wheel and is coaxial with the sun wheel, and a rotary input/output element. Such torque transmitting apparatus further comprises first and second clutches and a housing. The first clutch includes means for coupling the carrier with the input/output element and has engaged and disengaged conditions in which the first clutch respectively transmits torque between the input/output element and the carrier and permits the input/output element and the carrier to rotate relative to each other. A biasing means yieldably biases the coupling means of the first clutch to the engaged condition. The housing at least partially surrounds the planetary. The second clutch is fluid operated and includes means for coupling the internal wheel with the housing. The coupling means of the second clutch can assume engaged and disengaged conditions in which the second clutch respectively transmits torque between the internal wheel and the housing and permits the internal wheel to rotate relative to the housing.

An additional feature of the present invention resides in the provision of an apparatus which comprises coaxial first and second clutches. The first clutch constitutes a disc clutch (e.g., a multiple-disc clutch) and includes an axially fixed input component constituting a planet wheel carrier of a planetary for use as a means for reversing the direction of advancement of a motor vehicle having an engine. The first clutch further comprises an axially fixed rotary output component, a first substantially disc-shaped member which is axially movably installed between the input and output components, a diaphragm spring having a first portion serving to move the first member axially, and discs which serve to establish a torque-transmitting connection between the input and output components in response to axial movement of the first member under the bias of the spring. The second clutch constitutes a brake and includes a second substantially disc-shaped member serving to connect an internal wheel of the planetary with a housing which at least partially surrounds the brake so that the internal wheel is held against rotation relative to the housing and against axial movement at least in the direction of the bias of the spring upon the first member. The diaphragm spring includes a second portion which bears against the second member. The internal wheel, the first clutch and the second substantially disc-shaped member together constitute an assembly or module which is stressed by the spring and is movable in the direction of the common axis of the first and second clutches. The clutch of the assembly (i.e., the first clutch) is engaged and the internal wheel of the assembly bears against an axially movable portion of the first clutch. The spring is disposed between the first and second members (as seen in the direction of the common axis of the first and second clutches) and each of the two members has a friction surface which faces away from the spring. The friction surface of the first member confronts a friction surface of a piston which is reciprocable in the direction of the common axis of the first and second clutches, and the friction surface of the second member confronts and is spaced apart from a friction surface of the housing. The piston is movable toward the friction surface of the housing in one direction of the common axis to thereby reduce the distance of the friction surface of the second member from the friction surface of the housing against the opposition of the spring until the friction surface of the second member engages the friction surface of the housing. The piston is thereafter movable in the same direction (i.e., in one of the directions of the common axis of the first and second clutches) against the opposition of the spring to thereby move the first member away from the discs of the first clutch with attendant disengagement of the first clutch.

The apparatus further comprises a start-up clutch which connects the first clutch with the output element of the engine of the motor vehicle, and a variable-speed transmission which is connected with the output component of the first clutch. The piston is preferably movable against the opposition of the spring to a position in which the second clutch is acted upon exclusively by a hydraulic fluid in a cylinder which can form part of the housing for the planetary and confines the piston.

BRIEF DESCRIPTION OF THE DRAWINGS

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings, wherein:

FIG. 1a is a schematic partly elevational and partly sectional view of a portion of a power train wherein the input element of an infinitely variable transmission with two adjustable sheaves receives torque from a reversible apparatus which constitutes one embodiment of the invention and is driven by one type of start-up component;

FIG. 1b is similar to FIG. 1a but illustrates another type of start-up component;

DESCRIPTION OF PREFERRED EMBODIMENTS

Figure 2A:
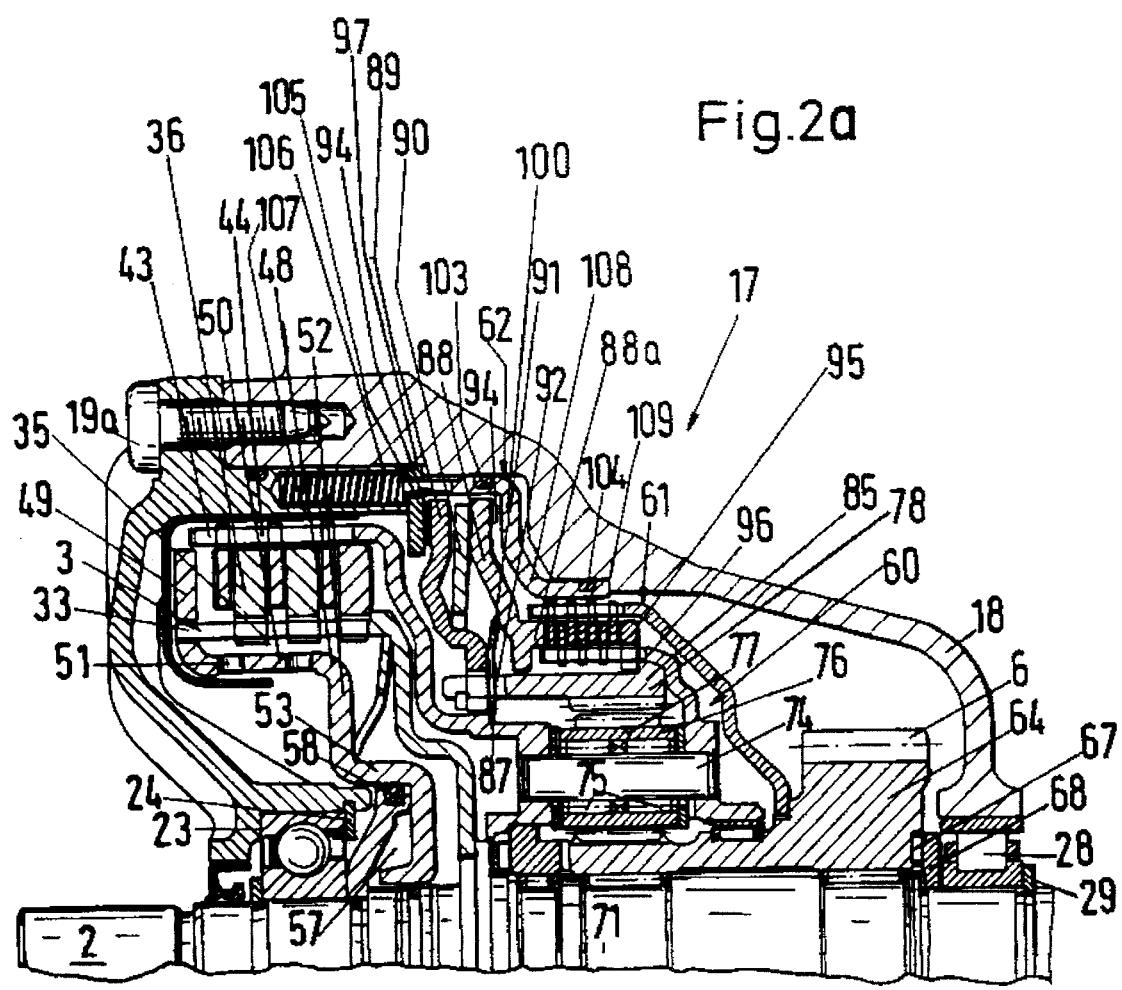
FIG. 2a is an enlarged axial sectional view showing a torque transmitting apparatus which can be utilized in the power train of FIG. 1 in one condition.

Referring first to FIG. 1a, there is shown a portion of a power train 1 which can be utilized in a motor vehicle to transmit torque from the rotary output element 2 (e.g., a crankshaft) of a combustion engine E to the input element of a variable speed transmission, here shown as an infinitely variable transmission including two adjustable sheaves 9, 12 and an endless flexible element 16 (comprising, e.g., one or more belts or chains) which is trained over the sheaves. An infinitely variable transmission with two adjustable sheaves and an endless flexible element is disclosed, for example, in commonly owned U.S. Pat. No. 5,169,365 granted Dec. 8, 1992 to Oswald Friedmann for "Power Train". The disclosure of the patent to Friedmann is incorporated herein by reference.

The output element 2 of the engine can be said to constitute (or is connected with) the input element of the power train 1, and such input element serves to transmit torque to a start-up component 3 which can constitute a friction clutch or a disc clutch. It is also possible to employ a fluid-operated clutch, e.g., a hydrodynamic clutch (e.g., a Föttinger clutch or a torque converter). In such a case, illustrated in FIG. 1b, the start-up component 3 would further comprise a lock-up clutch which can establish a mechanical connection between the input and output elements of the torque converter to thus enhance the efficiency of the component 3. Still further, it is possible to employ a start-up component 3 which includes or constitutes a magnetic coupling or any other start-up component which can be utilized to effect the transmission of torque from the output element of a prime mover (such as the engine E) to the input element of a reversible torque transmitting apparatus 4 which is shown in FIGS. 1a and 1b and serves to transmit torque from the component 3 to one of several gears forming part of a gear train 5. The purpose of the apparatus 4 is to transmit torque to the first gear 6 of the power train 5 in a clockwise or in a counterclockwise direction, depending upon whether the motor vehicle is to be driven in a forward direction or in a rearward direction. The details of a presently preferred torque transmitting apparatus 4 (which can be assembled with the start-up component 3 to transmit torque from the engine E to the gear 6) will be fully described with reference to FIGS. 2a through 6.

The illustrated gear train 5 comprises the aforementioned first gear 6 and a second gear 7 which mates with the gear 6 and transmits torque to a torque monitoring device 8. The gears 6 and 7 of the illustrated gear train 5 are spur gears; however, it is equally possible to employ a gear train having bevel gears or helical gears. Still further, it is possible to omit the gear train 5 or an equivalent torque transmitting unit, i.e., to transmit torque from the output element of the apparatus 4 directly to the torque monitoring device 8 or directly to the adjustable sheave 9 of the variable speed transmission that includes the sheaves 9, 12 and the flexible element 16.

The torque monitoring device 8 employs a set of spherical elements flanked by ramps and can be constructed, assembled and operated in a manner as disclosed, for example, in published German patent application Serial No. 42 34 294.5.

The adjustable sheave 9 of the variable speed transmission which is shown in FIGS. 1a and 1b includes a fixedly mounted flange 10 and a second flange 11 which is coaxial with and is movable toward and away from the flange 10 as indicated by a double-headed arrow X. The flange 10 shares the rotary movements of the flange 11. The other sheave 12 also comprises an axially fixed rotary flange 13 and a second flange 14 which is coaxial and rotates with but is movable axially toward or away from the flange 13 (note the arrow Y). The reference character 15 denotes the output element of the variable speed transmission and the output element of the illustrated portion of the power train 1.

The endless flexible element 16 can comprise one or more endless V-belts, one or more endless chains or one or more endless belts assembled of links or the like. The ratio of the transmission including the sheaves 9, 12 and the element 16 can be changed by moving the axially movable flanges 11 or 14 toward or away from the respective fixedly mounted flanges 10 or 13 to thus change the effective radius of the element 16.

The power train 1 of FIGS. 1a and 1b renders it possible to infinitely vary the ratio of the RPM of the element 2 to the RPM of the element 15 within a desired range. Furthermore, the apparatus 4 renders it possible to reverse the direction of rotation of the element 15, i.e., to drive the motor vehicle in a forward direction or rearwardly. Such change in the direction of rotation of the element 15 can be achieved without changing the direction of rotation of the element 2.

Figure 2B:
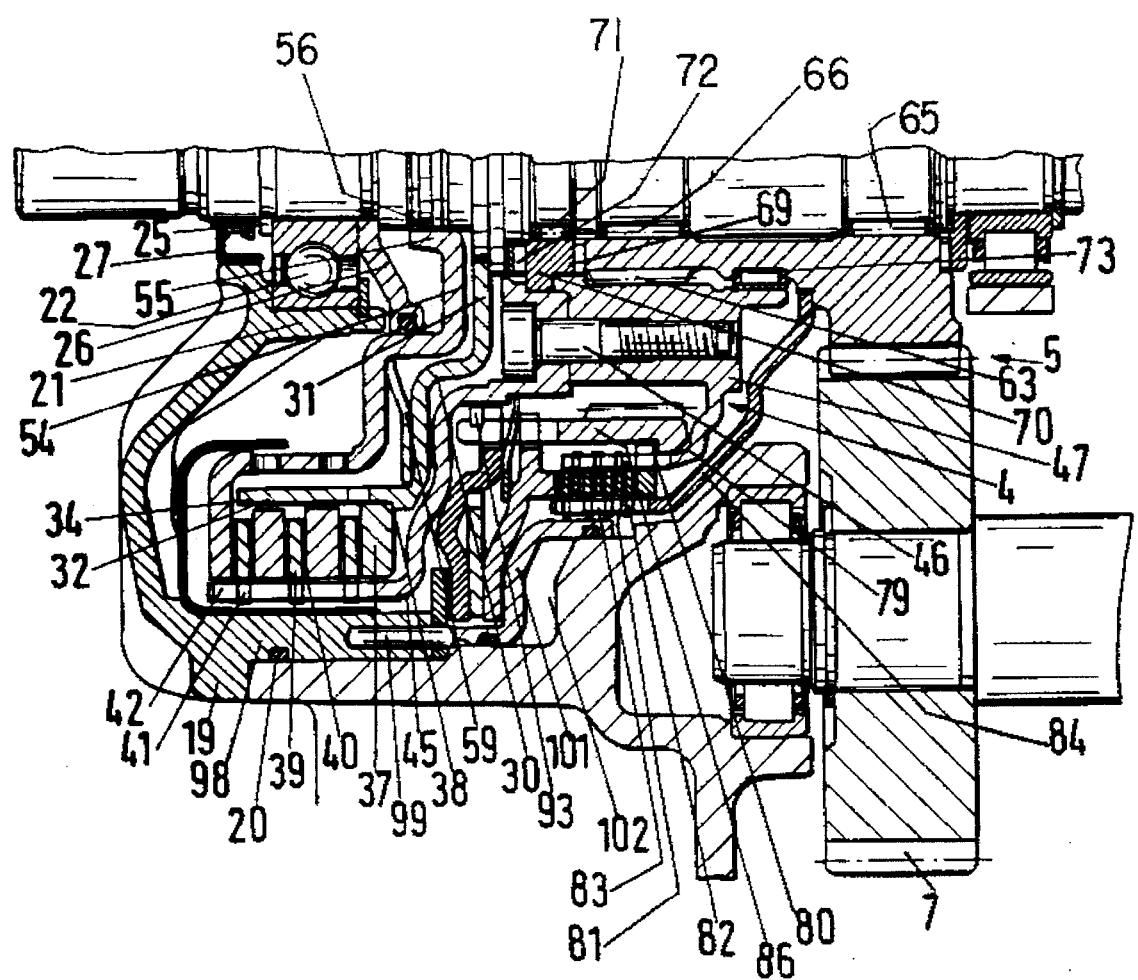
FIG. 2b is similar to FIG. 2a but shows the torque transmitting apparatus in another condition.

FIGS. 2a and 2b show a unit 17 which includes one presently preferred embodiment of the reversible torque transmitting apparatus 4 and one presently preferred embodiment of the start-up component 3. FIG. 2a illustrates the parts of the apparatus 4 in positions which they assume when the element 15 is to be driven in a first (forward or main) direction. The start-up component 3 is then open, i.e., it is idling. FIG. 2b illustrates the parts of the apparatus 4 in the positions they assume when the element 15 is driven to rotate in a second (rearward) direction. At such time, the start-up component 3 is closed. Thus, a vehicle which embodies a power train 1 including the structure of FIGS. 2a and 2b can be driven in a forward direction when the parts of the unit 17 assume the positions shown in FIG. 2a but the vehicle is driven or can be driven rearwardly if the parts of the unit 17 assume the positions shown in FIG. 2b.

The apparatus 4 of FIGS. 2a and 2b comprises a housing 18 which further accommodates the start-up component 3 as well as the gear 6 of the gear train 5. The housing 18 includes a main portion or section and a cover 19 which is affixed to the main portion by bolts 19a or other suitable fasteners. A sealing element 20 (e.g., an O-ring) is interposed between the main portion of the housing 18 and its cover 19 to seal the interior of the housing from the surrounding atmosphere. The radially innermost portion 21 of the cover 19 of the housing 18 surrounds an antifriction bearing 22 on the input element 2. The illustrated bearing 22 is an annular ball bearing with a single row of rolling elements and its inner race surrounds the corresponding portion of the input element 2. The outer race of the bearing 22 is held against axial movement relative to the element 2 by an internal shoulder or collar 23 of the cover 19 and by a split ring 24 which is received in an internal groove of the cover portion 21. The inner race of the bearing 22 is also held against axial movement relative to the input element 2. To this end, the element 2 is provided with an external groove for a split ring 25 which is adjacent the left-hand axial end of the inner race (as viewed in FIGS. 2a and 2b), and the element 2 carries a dished retainer 26 which abuts the right-hand end face of the inner race of the bearing 22. The retainer 26 is held against any axial movement relative to the input element 2. A sealing element 27 is provided to seal the space for the bearing 22 from the engine E (such engine is assumed to be located to the left of the unit 17 which is shown in FIGS. 2a and 2b). The illustrated sealing element 27 is a radial lip seal which is adjacent the split ring 25 and sealingly engages the corresponding portion of the element 2 as well as the adjacent portion of the cover 19.

That end portion of the input element 2 which is remote from the engine E is surrounded by a movable bearing 28 and this movable bearing, in turn, is mounted in the adjacent part of the main portion of the housing 18. The bearing 28 which is actually shown in FIGS. 2a and 2b comprises a single annulus of cylindrical rolling elements between an inner race which surrounds the adjacent portion of the element 2 and an outer race axially movably received in the adjacent part of the main portion of the housing 18. A split ring 29 is anchored in a groove in the external surface of the element 2 and abuts the right-hand end face of the inner race of the bearing 28. A further ring 68 is adjacent the left-hand end face of the inner race of the bearing 28 and is also mounted on the element 2 without any freedom of axial movement relative thereto. The outer race of the bearing 28 is snugly fitted into, but is free to move axially within, the adjacent part of the main portion of the housing 18.

The input element 2 further carries a cupped driving or input flange 30 which forms part of the start-up component 3 and is non-rotably affixed to the element 2 in such a way that the element 2 and the input member 30 cannot rotate relative to each other. The member 30 is mounted in such an orientation that its bottom wall is remote from the engine E, i.e., its open end faces the cover 19 of the housing 18. The bottom wall of the member 30 includes a recessed central portion 31 which extends away from the engine E, as seen in the axial direction of the input element 2. The recessed portion 31 of the bottom wall of the member 30 is provided with a central opening for the corresponding portion of the input element 2; such portion of the input element 2 is welded or otherwise non-rotatably affixed to the member 30. The latter further includes a substantially cylindrical shell or wall 32 which extends from the bottom wall of the member 30 in a direction toward the cover 19 (i.e., toward the engine E) and is provided with axially parallel slots 33 alternating with axially parallel prongs 34. The prongs 34 of the shell 32 extend into recesses 35 provided in the input discs or laminations 36 of the start-up component 3. The latter constitutes a multiple-disc clutch and the afore-described interdigitation of the prongs 34 and laminations or discs 36 renders it possible to ensure that the discs 36 can move axially of, but cannot turn relative to, the input member 30 of the start-up component 3. The reference character 37 denotes a lamination or disc which is remotest from the engine E, and the radially innermost portion of such disc abuts an external shoulder 38 on the shell 32 of the member 30.

The input or driving discs 36 of the component 3 alternate with output discs or laminations 39 (as seen in the axial direction of the input element 2), and each lamination 39 carries two friction linings 40, one facing toward and the other facing away from the cover 19. It is equally possible to provide friction linings on the discs 36, 37 or to provide such friction linings on the laminations 39 as well as on the discs 36, 37.

The radially outer portions of the laminations 39 are provided with slots 41 for the axially parallel prongs 42 of a cupped output member 45 of the component 3. The prongs 42 alternate with axially parallel slots 43 which are provided in the substantially cylindrical wall or shell 44 of the output member 45. The member 45 is similar to the member 30 and is dimensioned in such a way that it surrounds at least the major part of the member 30 in the radial and axial directions of the corresponding portion of the input element 2. The output member 45 further includes a substantially radially inwardly extending bottom wall with a centrally located recessed portion surrounding the adjacent portion of the input element 2. Such recessed portion of the bottom wall of the output member 45 also extends axially of the element 2 in a direction away from the engine E, and the bottom wall of the member 45 is non-rotatably affixed to a rotary planet wheel carrier 47 by a set of bolts 46 or other suitable fasteners. The carrier 47 forms part of a planetary transmission 60 (hereinafter planetary) which is installed in the main portion of the housing 18.

An actuator 48 for the start-up component 3 is installed between the retainer 26 and the input member 30, and more specifically between the retainer 26 and the recessed portion 31 of the bottom wall of the member 30 (as seen in the axial direction of the input element 2). The actuator 48 includes a washer-like radially outer portion 49 which is slotted to receive the prongs 34 in such a way that the actuator 48 and the member 30 cannot rotate relative to each other but are free to move relative to each other in the axial direction of the element 2. The actuator 48 further includes an axially extending portion or wall 50 which is located radially inwardly of the washer-like portion 49 and within the axially extending shell 32 of the input member 30. The portion 50 of the actuator 48 is provided with radially extending bores or holes 51 and extends from the portion 49 in a direction away from the engine E to merge into a radially inwardly extending portion 52 of the actuator 48. The portion 52 merges into an axially extending substantially cylindrical portion 53 which, in turn, merges into a radially inwardly extending washer-like portion 54 of the actuator 48. The portion 53 extends axially of the element 2 and away from the engine E, i.e., from the radially extending portion 52 to the radially extending portion 54, and the latter merges into a cylindrical portion 55 which extends from the portion 54 toward the engine E and surrounds the corresponding portion of the element 2. A sealing element 56 (e.g., an O-ring) is installed in an external groove of the element 2 and sealingly engages the internal surface of the cylindrical portion 55. The aforedescribed mounting of the actuator 48 ensures that it is free to move axially of, as well as rotate on, the input element 2.

The cylindrical portion 53 of the actuator 48 surrounds an annular cylinder chamber 57 which is bounded in part by the retainer 26, in part by the input element 2, in part by the cylindrical portion 55 of the actuator 48, in part by the radially extending portion 54 of the actuator 48, and in part by the axially extending portion 53 of the actuator 48. The chamber 57 is sealed by the aforementioned sealing element 56 and a second sealing element 58 (e.g., an O-ring) which is installed in an external recess of the retainer 26 and sealingly engages the internal surface of the adjacent cylindrical portion 53 of the actuator 48.

If the disc clutch which constitutes the start-up component 3 is to be closed or engaged, the chamber 57 receives pressurized fluid (preferably a hydraulic fluid, such as oil) so that the actuator 48 is moved axially of the input element 2 and away from the engine E until the radially outermost portion 49 of the actuator comes into abutment with the adjacent output disc or lamination 39. As the pressure of fluid in the chamber 57 continues to rise, the portion 49 of the actuator 48 urges the laminations 39 against the adjacent laminations or discs 36 and 37. As already described above, the disc 37 which rotates with the input member 30 bears against the external abutment 38 of the input member 30 so that the disc 37 cannot move away from the engine E beyond the axial position which is shown in FIGS. 2a and 2b. When the component 3 is engaged, it can transmit torque from the input member 30 to the actuator 48 and hence to the output member 45.

The component 3 is disengaged or deactivated in response to a reduction of fluid pressure in the chamber 57. This enables an energy storing element 59 (which is stressed during admission of pressurized fluid into the chamber 57) to dissipate energy in order to return the actuator 48 to a starting position in which the input member 30 can turn relative to the output member 45 of the component 3. At the same time, the energy storing element 59 (here shown as a diaphragm spring) causes the actuator 48 to expel fluid from the chamber 57. The illustrated energy storing element 59 is surrounded and preferably centered by the internal surface of the cylindrical shell 32 of the input member 30 and reacts against the bottom wall in the region surrounding the recessed portion 31. The radially inner portion of the element 59 bears against the adjacent surface of the radially extending portion 52 of the actuator 48 to urge the latter in a direction toward the engine E. FIG. 2a shows the component 3 in the open or disengaged condition, and the closed or engaged condition of such component is shown in FIG. 2b. Thus, that portion of the chamber 57 which is shown in FIG. 2b is filled with a pressurized fluid which causes the element 59 to store energy sufficient to ensure that the actuator 48 is pushed back to the axial position shown in FIG. 2a as soon as the pressure of fluid in the chamber 57 is reduced accordingly.

The aforementioned planetary 60 forms part of the reversible torque transmitting apparatus 4 and the latter further comprises a first clutch 61 and a second clutch 62. The first clutch 61 of the apparatus 4 which is shown in FIGS. 2a and 2b is a multiple-disc clutch, and the second clutch 62 is a friction clutch which can be said to perform the function of a brake. The friction surfaces of the clutch 62 which is shown in FIGS. 2a and 2b are located radially outwardly of the friction surfaces of the clutch 61 and are provided in part on the main portion of the housing 18.

The planetary 60 further comprises a sun gear or wheel 63 which, in the embodiment of the apparatus 4 shown in FIG. 2a and 2b, is of one piece with the first gear 6 of the gear train 5. The teeth of the gear 6 are spaced apart from the teeth of the wheel 63, as seen in the axial direction of the input element 2. FIGS. 2a and 2b show that the sun wheel 63 and the gear 6 constitute two axially spaced-apart portions of a hollow tubular member or shaft 64 which is coaxial with and surrounds the adjacent portion of the input element 2.

The shaft 64 is rotatable on needle bearings 65 and 66 (or other suitable antifriction bearings) which surround the input element 2. The arrangement is such that the bearing 65 is surrounded by the gear 6 and the bearing 66 is surrounded by the sun wheel 63 of the shaft 64. The inner races of the bearings 65 and 66 are of one piece with the input element 2, and the outer races of these bearings are of one piece with the gear 6 and the wheel 63, respectively.

A further needle bearing 67 (or another suitable antifriction bearing) surrounds the element 2 and is installed between the aforementioned ring 68 and the adjacent end face of the gear 6 to act as a thrust bearing for the shaft 64. The ring 68 constitutes or includes one race and the shaft 64 constitutes or includes the other race for the rolling elements of the needle bearing 67. Still another needle bearing 69 (which acts as a thrust bearing) is interposed between the left-hand end face of the hollow shaft 64 and an annular member 70 which has a substantially L-shaped cross-sectional outline and surrounds a needle bearing 71. The latter surrounds the adjacent portion of the input element 2 to the left of the sun wheel 63, as viewed in FIGS. 2a and 2b. A further needle bearing 72, which performs the function of a thrust bearing, is interposed between the member 70 and a collar of the element 2. The needle bearing 72 surrounds the element 2 and the member 70 is rigidly connected to the carrier 47 of the planetary 60.

The needle bearings 69, 71 and 72 do not comprise discrete pairs of races. Thus, one race for the thrust bearing 69 is of one piece with the shaft 64 and the other race for this bearing is of one piece with the member 70. One race of the bearing 71 is of one piece with the input element 2 and the other race of this bearing is of one piece with the member 70. One race of the bearing 72 is of one piece with the member 70, and the other race of this bearing is of one piece with the aforementioned collar of the element 2. The member 70 and the parts (including the carrier 47 and the output member 45) which are connected thereto can rotate relative to the input element 2 as well as relative to the hollow shaft 64.

A further needle bearing 73 (or any other suitable antifriction bearing) is interposed between the carrier 47 and the adjacent portion of the shaft 64 to constitute a radial bearing between the sun wheel 63 and the gear 6.

The races for the aforediscussed radial and thrust bearings can be of one piece with the parts between which the bearings are mounted, or such races can constitute films of suitable wear-resistant material which is applied to selected portions of the aforementioned parts. For example, the inner race for the radial bearing 71 can constitute a film of wear-resistant (metallic or plastic) material on the input element 2, and the outer race of the bearing 71 can constitute a film of wear resistant material on the internal surface of the member 70. Still further, it is possible to employ separately produced inner and/or outer races for the aforediscussed radial bearings and first and/or second races for the aforediscussed thrust bearings without departing from the spirit of the invention. A discrete left-hand race is shown in FIGS. 2a and 2b for the thrust bearing 72, and a discrete outer race is shown for the radial bearing 73.

The carrier 47 of the planetary 60 supports several shafts 74 for planet pinions or wheels 76 and 77. Each shaft 74 is mounted in the carrier 47 as well as in the output member 45. To this end, the parts 47 and 45 are provided with recesses or bores for the respective end portions of the shafts 74. Each such shaft is surrounded by a needle bearing 75 for the respective planet wheel 76 or 77. The axes of the shafts 74 are parallel to the axis of the input element 2. Suitable disc-shaped distancing members (not referenced but shown in FIGS. 2a and 2b) are interposed between the ends of the bearings 75 on the one hand and the carrier 47 and output member 45 on the other hand. The illustrated needle bearings 75 do not have separately produced inner and/or outer races, i.e., the needles of such bearings are installed directly between the external surfaces of the respective shafts 74 and the internal surfaces of the respective planet wheels 76, 77. The aforementioned distancing members need not constitute separately produced parts; for example, they can be replaced by films of wear resistant material on the end faces of the planet wheels 76 and 77, output member 45 and carrier 47.

FIGS. 2a and 2b merely show a single planet wheel 76. Each planet wheel 76 meshes with one planet wheel 77 (one indicated in FIGS. 2a and 2b by broken lines). The planet wheels 76 mate with the sun wheel 63 and the planet wheels 77 mate with the internal wheel 78 of the planetary 60.

The carrier 47 includes a radially outwardly extending portion which merges into a frustoconical portion 79 which tapers toward the axis of the input element 2 in a direction away from the cover 19 of the housing 18. The frustoconical portion 79 of the carrier 47 merges into a cylindrical portion 80 which extends toward the cover 19 (i.e., toward the engine E which is assumed to be located to the left of the unit 17). The cylindrical portion 80 of the carrier 47 is provided with axially parallel prongs which alternate with axially parallel slots for the input discs or laminations 81 of the clutch 61. The cylindrical portion 80 of the carrier 47 can be said to constitute the input member of the disc clutch 61. The clutch 61 further comprises output discs or laminations 82 which alternate with the laminations 81 provided in a substantially cylindrical portion 83 of a substantially cup-shaped output member 84 of the clutch 61. The cylindrical portion 83 of the output member 84 surrounds the cylindrical portion 80, i.e., the input member, of the clutch 61. The cylindrical portion 83 of the output member 84 is also provided with axially parallel prongs which alternate with axially parallel slots, the same as the cylindrical portion 80.

The output member 84 of the clutch 61 surrounds the planetary 60 as well as the remaining constituents of the clutch 61. The bottom wall of the substantially cup-shaped output member 84 includes several portions having different diameters, and this bottom wall tapers toward the axis of the input element 2 in a direction away from the cover 19, i.e., away from the engine E. The radially innermost portion of the bottom wall of the output member 84 of the clutch 61 is welded or otherwise reliably affixed to the hollow shaft 64, i.e., the member 84 shares all angular movements of the sun wheel 63 and gear 6. Such radially innermost portion of the bottom wall of the output member 84 is disposed between the gear 6 and the bearing 73, as seen in the axial direction of the input element 2.

The internal wheel 78 of the planetary 60 is provided with a conical external centering surface 85 which tapers toward the axis of the element 2 in a direction away from the cover 19 of the housing 18 and cooperates with the complementary conical internal centering surface 79 of the carrier 47 when the parts of the unit 17 assume the positions which are shown in FIG. 2a.

The internal wheel 78 of the planetary 60 comprises an axially extending portion 86 which starts at the internal teeth of this wheel and extends toward the cover 19. A part of the portion 86 is provided with axially parallel prongs 87 alternating with axially parallel slots and being engaged by the adjacent portions of two substantially disc-shaped members 88, 89 which extend radially outwardly from the portion 86. The members 88 and 89 are shiftable axially of the input element 2, i.e., relative to the internal wheel 78, and the radially outer portions of these members flank a resilient element 90 here shown as a diaphragm spring. The radially inner portion of the spring 90 is centered by the member 89 and the radially outer portion of this spring bears against the adjacent radially outer portion of the member 88. The latter is further engaged by the radially outer portion of a second diaphragm spring 91. The distance of the radially outer portion of the spring 91 from the axis of the element 2 equals or approximates the distance of the radially inner portion of the spring 90 from the element 2. A radially median portion of the spring 91 abuts the adjacent portion of the member 89, and the radially inner portion of the spring 91 engages a stop 92 on the output member 45 of the component 3. FIG. 2a shows the radially inner portion of the spring 91 in actual abutment with the stop 92 of the output member 45 which can be considered to constitute a retainer for the spring 91.

A split ring 93 is received in an internal groove of the axially extending portion 86 of the internal wheel 78 to determine the axial positions of the members 88, 89 and diaphragm springs 90, 91.

Those surfaces of the substantially disc-shaped members 88 and 89 which face away from the diaphragm spring 90 are provided with friction linings 94. In other words, those surfaces of the members 88, 89 which face away from each other and from the spring 90 can be said to constitute friction surfaces. The member 88 includes a pressure transmitting annular portion 88a which can be of one piece with the member 88 or can constitute a separately produced part welded or otherwise affixed to the member 88. The annular portion 88a is adjacent the left-most lamination of the clutch 61 to bias the laminations of the clutch 61 against each other (i.e., to engage the clutch 61) when the member 88 is biased in a direction to the right, as viewed in FIGS. 2a and 2b. The package of laminations forming part of the clutch 61 includes the laminations 81 and 82.

The annular portion 88a of the disc-shaped member 88 also transmits the bias of the spring 90 to a lamination 95 of the clutch 61, i.e., the spring 90 can shift the lamination 95 axially of the input element 2 and away from the cover 19 of the housing 18. The axial movement of the lamination 95 away from the cover 19 is terminated when its radially inner portion reaches and abuts a stop 96 which is provided on the internal wheel 78 of the planetary 60. At such time, the conical external surface 85 of the internal wheel 78 engages and is centered by the complementary conical internal surface of the frustoconical portion 79 of the carrier 47. The internal wheel 78 is then centered relative to the carrier 47, hollow shaft 64 and input element 2. It will be seen that the internal wheel 78 is automatically centered in response to engagement of the clutch 61, i.e., when the clutch 61 is in a condition to transmit torque to the output member 84.

The clutch 62 which is shown in FIGS. 2a and 2b is a friction clutch having a counterpressure plate or disc 97 with a friction surface confronting the friction surface (lining 94) on the adjacent disc-shaped member 89. The counterpressure plate 97 is disposed between a stop of the housing 18 and an outer portion 98 of the cover 19 so that it is maintained in a predetermined axial position relative to the housing 18. In addition, the counterpressure plate 97 is held against rotation in the housing 18 by axially parallel pins or studs 99 each of which extends through the plate 97 and each of which has an end portion extending into a blind bore or hole in the radially outer portion 98 of the cover 19. Each of the pins 99 can be a press fit in the counterpressure plate 97 and in the radially outer portion 98 of the cover 19. The latter is non-rotatably affixed to the main portion of the housing 18.

The friction clutch 62 further comprises an axially movable pressure plate or disc 100 having a friction surface confronting the friction surface (lining 94) of the disc-shaped member 88. The illustrated pressure plate 100 is of one piece with a piston 101 forming part of an actuating device which serves to engage and disengage the clutches 61 and 62. The piston 101 has an annular shape and is reciprocable in the adjacent portion of the housing 18, i.e., the main portion of the housing 18 constitutes a cylinder for the piston 101 and is part of the aforementioned actuating device which can engage and disengage the clutches 61 and 62.

The piston 101 and the main portion or cylinder of the housing 18 define an annular cylinder chamber 102 which is filled with oil or another suitable hydraulic fluid and is sealed by two sealing elements 103, 104. These sealing elements prevent uncontrolled escape of hydraulic fluid from the cylinder chamber 102. The piston 101 is movable relative to the main portion or cylinder of the housing 18 in the axial direction of the input element 2 but cannot rotate in the cylinder. To this end, the piston 101 (which has a substantially S-shaped cross-sectional outline)is provided with axially parallel extensions 105 which are reciprocable in complementary openings (e.g., windows or slots) of the counterpressure plate 97.

The extensions 105 of the piston 101 serve as supports for coil springs 107. These coil springs surround the respective extensions 105 at that side of the counterpressure plate 97 which faces away from the disc-shaped member 89, i.e., which faces toward the engine E. The illustrated coil springs 107 can be replaced with other types of resilient energy storing elements without departing from the spirit of the invention. Each spring 107 is at least partially confined in a blind bore or hole 106 provided therefor in the radially outer portion 98 of the cover 19. These springs store energy or store additional energy when the piston 101 of the hydraulic actuating means for the clutches 61 and 62 is caused to move in a direction to the left, i.e., toward the cover 19 and the engine E. In other words, the springs 107 tend to move the piston 101 toward the right-hand end position which is shown in FIG. 2a. At such time, the cylindrical right-hand portion 108 of the piston 101 abuts an internal stop 109 in the main portion or cylinder of the housing 18.

The manner in which the cylinder chamber 102 can receive pressurized hydraulic fluid from a pump or another suitable source through one or more passages in the main portion of the housing 18 and in which hydraulic fluid can be expelled from the chamber 102 is not specifically shown in FIGS. 2a and 2b.

The unit 17 which is shown in FIGS. 2a and 2b operates in such a way that when the engine E drives the input element 2, the element 2 transmits torque to the start-up component 3. If the component (clutch) 3 is engaged, it transmits torque to the reversible torque transmitting apparatus 4 which, in turn, transmits torque to the gear 6 of the gear train 5. The gear 6 drives the gear 7 which transmits torque to the sheave 9.

It is also within the purview of the invention to reverse the positions of the start-up component 3 and the apparatus 4 in the power train 1 of FIG. 1a and 1b, e.g., in such a way that the element 2 transmits torque to the apparatus 4 which then transmits torque to the gear 6 through the start-up component 3. The gear 6 drives the gear 7 which transmits torque to the output element 15 through the parts 9, 12 and 16 of the infinitely variable transmission shown in the right-hand portion of FIGS. 1a and 1b or another suitable transmission.

It is further possible to utilize the gear 7 as an input element which transmits torque to the gear 6 of the gear train 5 and the gear 6 transmits torque to the (output) element 2 through the start-up component 3 and reversible apparatus 4.

Still further, it is possible to install the unit 17 at another point in the power train 1, for example, downstream or behind the infinitely variable transmission including the adjustable sheaves 9 and 12. It is also possible to break up the unit 17 into a discrete start-up component 3 and a discrete reversible torque transmitting apparatus 4. Moreover, the component 3 and the apparatus 4 need not be directly connected with each other.

The manner in which the power train 1 of FIGS. 1a and 1b is to be operated in order to change the direction of rotation of the output element 15 without changing the direction of rotation of the input element 2 will be described with reference to FIGS. 3 to 6 and also with continuous reference to the unit 17 of FIGS. 2a and 2b.

The start-up component (clutch) 3 is assumed to be engaged, i.e., it can transmit torque from the input element 2 to the output element 45 which, in turn, transmits torque to the carrier 47 of the planetary 60.

Figure 3:
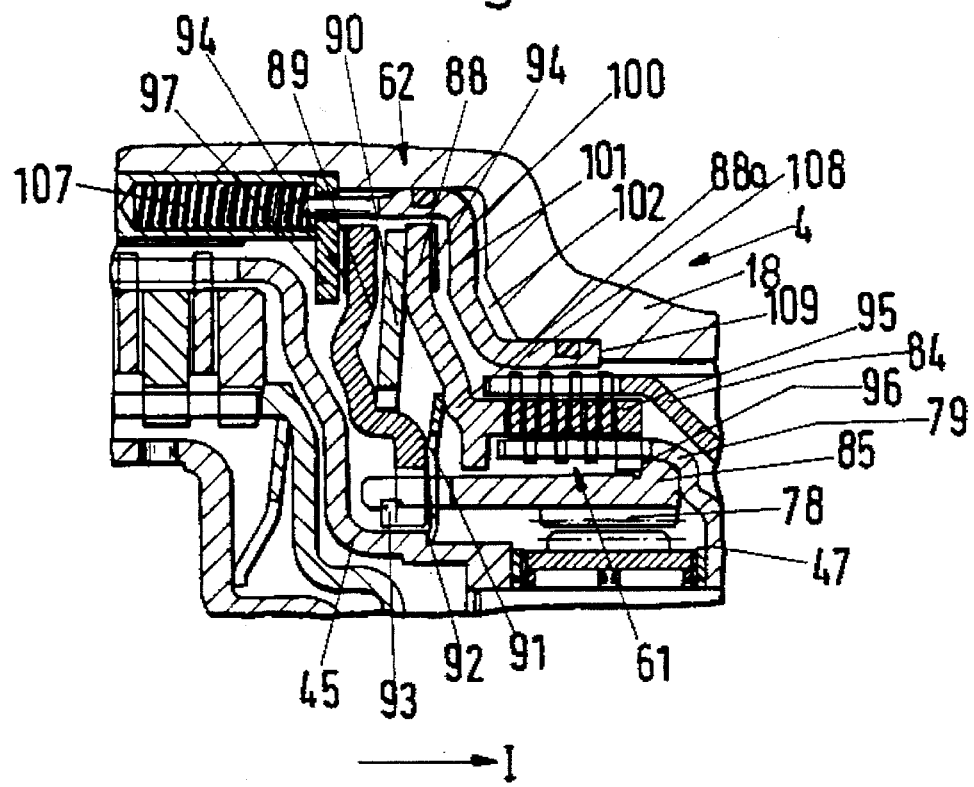
FIG. 3 is an enlarged view of a detail in the apparatus of FIGS. 2a and 2b and illustrates a first stage of operation of such apparatus.
Figure 6:
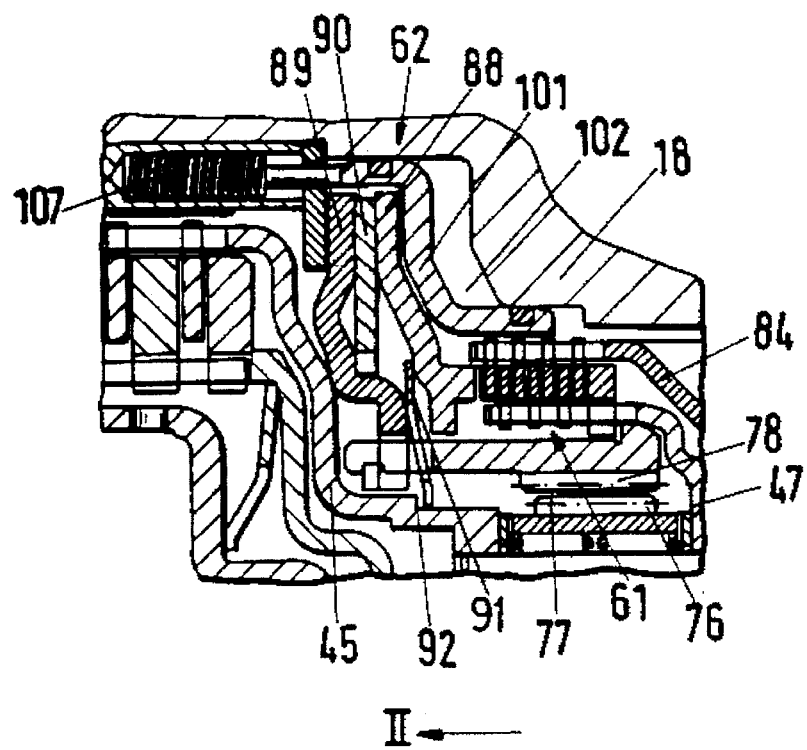
FIG. 6 illustrates the structure of FIGS. 3 to 5 but with certain parts in different positions corresponding to still another stage of operation of the torque transmitting apparatus.

FIG. 3 illustrates certain parts of the unit 17 in the positions they assume when the input element 2 is to drive the output element 15 in a forward direction, namely in a direction to move the vehicle utilizing the power train 1 forwardly. The mutual positions of the parts shown in FIG. 3 correspond to those in FIG. 2a but with the start-up component 3 in the engaged condition. FIG. 6 shows certain parts of the unit 17 in positions which they assume when the input element 2 drives the output element 15 in the opposite direction, i.e., in a direction to move the vehicle rearwardly. The positions of the parts shown in FIG. 6 correspond to those shown in of FIG. 2b.

Referring now to FIG. 3 in detail, the cylinder chamber 102 is or can be filled with a hydraulic fluid but such fluid is not pressurized so that the axially extending portion 108 of the piston 101 abuts the stop 109 at the internal surface of the main portion or cylinder of the housing 18. The bias of the coil springs 107 suffices to ensure that the piston 101 remains in contact with the stop 109 whereby the pressure plate 100 (which is shown as being of one piece with the piston 101 ) maintains its (left-hand) friction surface out of contact with the friction surface (lining) 94 at the right-hand side of the disc-shaped member 88 which forms part of the clutch (brake) 62. Such construction of the unit 17 ensures that the pressure plate 100 and the disc-shaped member 88 are kept out of frictional engagement with one another, i.e., one can avoid the development of drag torque.

The diaphragm spring 90 tends to move the disc-shaped members 88 and 89 axially of the input element 2 and away from each other. Thus, the radially inner portion of the spring 90 reacts against the member 89 and its radially outer portion biases the member 88 in a direction to the right, i.e., away from the member 89. This causes the pressure- or bias-transmitting portion 88a of the disc-shaped member 88 to bear against the adjacent package of laminations forming part of the clutch 61 so that the neighboring laminations of the package frictionally engage each other and the right-most lamination 95 is caused to bear against the internal stop 96 of the internal gear 78. The clutch 61 is ready to transmit torque. The split ring 93 secures the internal gear 78 to the disc-shaped member 88 so that the polygon of forces is closed.

It will be seen that the disc-shaped member 89, the diaphragm spring 90, the disc-shaped member 88, the clutch 61 (with its lamination 95) and the internal gear 78 of the planetary together constitute a balanced assembly or module which is movable, in its entirety, in the axial direction of the input element 2. The means for moving the assembly or module in the axial direction of the element 2 includes the diaphragm spring 91. The radially inner portion of the spring 91 reacts against the stop 92 of the output member 45 and the radially outer portion of this spring bears against the radially inner portion of the disc-shaped member 88 to urge the member 88 axially of the element 2 and away from the engine E. This causes the aforementioned assembly or module to move in the direction of the arrow I until the conical surface 85 of the internal gear 78 reaches and is arrested by the complementary conical surface of the frustoconical portion of the carrier 47. This entails automatic centering of the internal gear 78 and of the entire module relative to the carrier 47, hollow shaft 64 and input element 2. At such time, the diaphragm spring 91 is spaced apart from the disc-shaped member 89 in the axial direction of the element 2, i.e., the parts 89 and 91 cannot contact each other.

When the aforementioned assembly or module reaches its right-hand end position (upon completion of the movement in the direction of the arrow I), the friction surface (lining) 94 of the disc-shaped member 89 and the friction surface of the counterpressure plate 97 are disengaged from each other. This prevents the development of friction between the member 89 and the counterpressure plate 97 which, in turn, prevents the development of drag torque.

The engaged clutch 61 which is shown in FIG. 3 establishes a torque transmitting connection between the carrier 47 and the cup-shaped or drum-shaped output member 84. Thus, when the input element 2 drives the carrier 47, the engaged clutch 61 serves as a means for transmitting torque from the carrier 47 directly to the output member 84, i.e., to the pinion 6 which is welded or otherwise non-rotatably connected to the member 84. Accordingly, the RPM of the input element 2 then matches the RPM of the start-up component 3, planetary 60, clutches 61, 62, hollow shaft 64 and pinion 6 of the gear train 5. In other words, the sun wheel 63, the planet wheels 76, 77 and the internal wheel 78 of the planetary 60 cannot rotate relative to each other. Since the friction lining or linings 94 on the disc-shaped member 88 are spaced apart from the pressure plate 100 of the piston 101, and since the friction linings 94 on the disc-shaped member 89 are also spaced apart from the counterpressure plate 97, the unit 17 operates with a high degree of efficiency because it prevents the development of drag torque.

Figure 4:
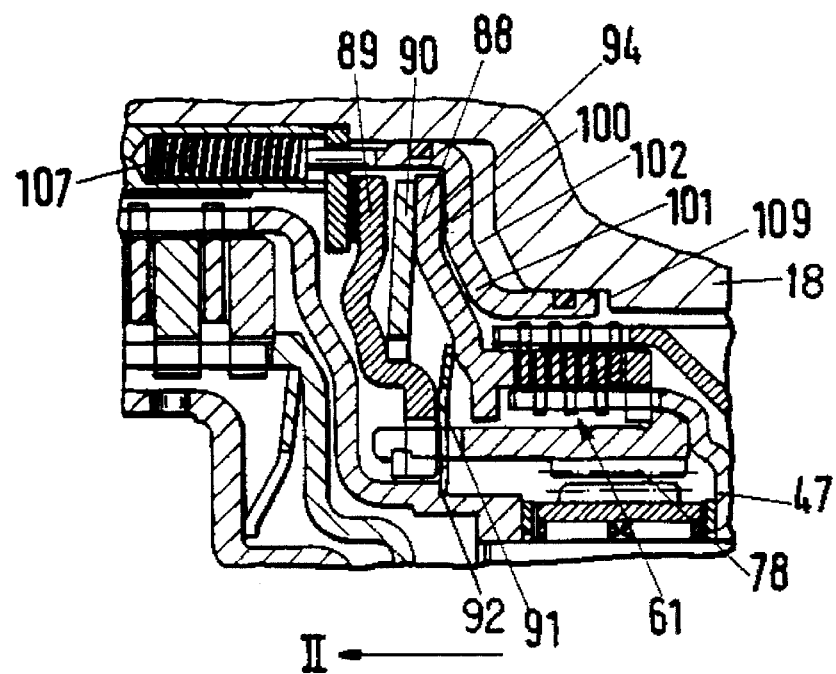
FIG. 4 illustrates the structure of FIG. 3 but with certain parts in different positions which they assume during a second stage of operation of the torque transmitting apparatus.
Figure 5:
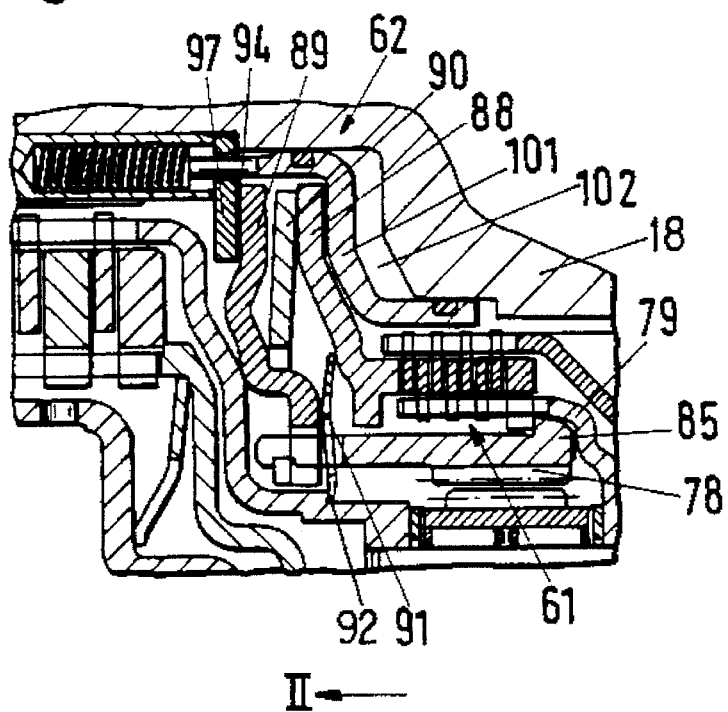
FIG. 5 illustrates the structure of FIGS. 3 and 4 but with certain parts in different positions which they assume during a third stage of operation of the torque transmitting apparatus.

FIGS. 4 and 5 illustrate two successive stages of the reversing procedure, and FIG. 6 illustrates certain parts of the unit 17 in the positions which they assume when the reversal of the direction of rotation of the output element 15 is completed, i.e., when the output element 15 rotates in a counterclockwise or in a clockwise direction if the engine E causes the input element 2 to rotate in a clockwise or in a counterclockwise direction. As can be seen in FIG. 4, pressurized fluid (e.g., oil) which fills the cylinder chamber 102 has caused the piston 101 to leave the axial position of FIG. 3 and to advance in the direction of the arrow II, i.e., the cylindrical right-hand portion 108 of the piston 101 is moved away from the internal stop 109 of the main portion or cylinder of the housing 18. As the piston 101 moves away from the stop 109 and toward the engine E, the coil springs 107 are caused to store energy or to store additional energy. The friction surface of the pressure plate 100 of the piston 101 engages the friction surface (linings) 94 at the right-hand side of the disc-shaped member 88. The positions of the member 88, clutch 61, internal wheel 78, planet wheel carrier 47 and disc-shaped member 89 relative to each other are still the same as shown in FIG. 3. Moreover, the bias of each of the diaphragm springs 90, 91 shown in FIG. 4 is the same as the bias of such springs when the parts of the unit 17 are held in the positions which are shown in the aforedescribed FIG. 3.

If the admission of pressurized hydraulic fluid into the cylinder chamber 102 continues, the parts of the unit 17 assume the positions which are shown in FIG. 5. Thus, the friction lining 94 of the disc-shaped member 89 engages the adjacent friction surface of the washer-like counterpressure plate 97 but the mutual positions of parts in the assembly including the clutch 61, the internal wheel 78, the members 88, 89 and the diaphragm spring 90 still remain unchanged. However, the entire assembly or module has been shifted in the direction of arrow II beyond the axial position which is shown in FIG. 4. Such shifting of the assembly takes place against the opposition of the diaphragm spring 91 and the internal wheel 78 is no longer centered because its surface 85 no longer contacts the complementary conical surface on the portion 79 of the carrier 47. This ensures that the internal wheel 78 is not centered at two different locations but is centered only by the clutch 62. The clutch 61 remains engaged due to the bias of the diaphragm spring 90.

If the admission of pressurized hydraulic fluid into the chamber 102 continues, the parts of the assembly 17 ultimately assume the mutual positions which are shown in FIG. 6. The piston 101 has been shifted axially of the input element 2 in the direction of the arrow II beyond the position which is shown in FIG. 5. This results in stressing of the diaphragm spring 90 because the disc-shaped member 88 has been moved toward the disc-shaped member 89. The flattened or substantially flattened diaphragm spring 90 stores a maximum amount of energy and permits a disengagement of the clutch 61. This interrupts the transmission of torque between the carrier 47 and the output member 84. The radially outer portion of the diaphragm spring 90 is moved toward the engine E due to axial movement of the member 88 toward the member 89 and a radially median or intermediate portion of the spring 90 comes into contact with the member 89 shortly before the member 88 reaches the axial position of FIG. 6. The last stage of axial movement of the member 88 in the direction of the arrow II to the end position of FIG. 6 results in simultaneous stressing of the diaphragm spring 91 by the member 88 as well as by the member 89 so that the radially inner portion of the spring 91 moves away from the stop 92 of the output member 45. This is desirable and advantageous because such deformation of the spring 91 prevents the development of friction and hence the development of drag torque. This is due to the fact that the clutch (brake) 62 cannot establish a torque transmitting connection between the spring 91 and the housing 18 while the output member 45 rotates with the planet carrier 47.

When the parts of the unit 17 assume the positions which are shown in FIG. 6, i.e., when the vehicle embodying the illustrated power train is ready to move rearwardly, the planet carrier 47 rotates with the output member 45, the clutch 61 is disengaged and the internal wheel 78 is held against rotation relative to the housing 18 because the clutch 62 is engaged. The transmission of torque takes place from the engine E and input element 2 to the carrier 47 and thence to the planet wheels 76 and 77 which mate with each other. As the planet carrier 47 rotates about the axis of the element 2, the planet wheel or wheels 77 roll along the stationary (braked) internal gear 78 and drive the planet wheel or wheels 76 which transmit torque to the sun wheel 63. The rotating sun wheel 63 causes the gear 6 (which shares all angular movements of the sun wheel) to drive the gear 7 and the gear 7 drives the adjustable sheave 9 in a manner as already described with reference to FIGS. 1a and 1b. The gear 6 is driven to rotate in a direction counter to that when the parts of the unit 17 assume the positions which are shown in FIG. 3.

The ratio of the RPM of the gear 6 to the RPM of the same gear while the gear 6 is caused to rotate in the first (FIG. 3) and second (FIG. 6) directions, respectively, depends upon the transmission ratio of the planetary 60. All that is necessary to change the direction of rotation of the output element 15 (without changing the direction of rotation of the input element 2) is to regulate the pressure of hydraulic fluid in the cylinder chamber 102. Thus, if the pressure of fluid in the chamber 102 is reduced, the springs 107 are free to push the piston 101 from the axial position of FIG. 6 back to the axial position of FIG. 3, i.e., the movements of various parts of the assembly 4 are reversed until the clutches 61, 62 are respectively engaged and disengaged as shown in FIG. 2a and in FIG. 3. Thus, one of the clutches 61, 62 is automatically engaged when the other of these clutches is disengaged.

The improved torque transmitting apparatus 4, the improved unit 17 and the improved power train 1 are susceptible of numerous additional modifications without departing from the spirit of the present invention. As already mentioned above, the components of the power train 1 need not be assembled in the same sequence as shown in FIGS. 1a and 1b, and the unit 17 can be broken up into a discrete torque transmitting apparatus 4 and a discrete start-up component 3. Still further, the illustrated planetary 60 can be replaced with any other suitable planetary.

The member 84 can be said to form part of the clutch 61 and/or of the planetary 60. In the appended claims, the member 84 will be referred to as a discrete part of the reversible torque transmitting apparatus 4 or an equivalent apparatus. When engaged, the clutch 61 transmits torque between the input/output element 84 and the planet carrier 47.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A torque transmitting apparatus comprising:

at least one planetary including a rotary sun wheel, an internal wheel coaxial with said sun wheel, at least one planet wheel in mesh with at least one of said sun and internal wheels, and a rotary carrier mounting said at least one planet wheel and coaxial with said sun wheel;

a rotary input/output element;

a first clutch including first coupling means for coupling said carrier with said input/output element, said first coupling means having engaged and disengaged conditions in which said first clutch respectively transmits torque between said input/output element and said carrier, and permits said input/output element and said carrier to rotate relative to each other;

biasing means for yieldably biasing said first coupling means to said engaged condition;

a housing at least partially surrounding said planetary;

a fluid-operated second clutch including second coupling means for coupling said internal wheel with said housing, said second coupling means of said second clutch having engaged and disengaged conditions in which said second clutch respectively transmits torque between said internal wheel and said housing, and permits said internal wheel to rotate relative to said housing; and a single piston for operating said first and second clutches, said piston constituting part of a cylinder and piston unit which is common to said first and second clutches and is non-rotatable relative to said housing.

2. The apparatus of claim 1, further comprising maintaining means for maintaining one of said first and second coupling means in the engaged condition when the other of said coupling means is disengaged, said biasing means forming part of said maintaining means.

3. The apparatus of claim 2, wherein said maintaining means includes means for automatically disengaging one of said coupling means in response to engagement of the other of said coupling means.

4. The apparatus of claim 2, wherein said maintaining means includes means for disengaging said second coupling means of said second clutch in response to engagement of said first coupling means of said first clutch.

5. The apparatus of claim 1, wherein at least a portion of said first clutch is mounted on said carrier.

6. The apparatus of claim 1, wherein at least a portion of said second clutch is mounted on said internal wheel.

7. The apparatus of claim 1, wherein at least one of said clutches is a disc clutch.

8. The apparatus of claim 7, wherein said first clutch is a disc clutch.

9. The apparatus of claim 1, wherein said second clutch is a friction clutch and said second coupling means of said second clutch includes two substantially disc-shaped members and a friction lining on at least one of said members.

10. The apparatus of claim 9, wherein said disc-shaped members are coaxial and at least one of said disc-shaped members is movable relative to the other of said members in the direction of the common axis of said members.

11. The apparatus of claim 1, wherein said second coupling means of said second clutch comprises at least one first friction lining, at least one second friction lining which engages said at least one first friction lining in the engaged condition of said second coupling means of said second clutch, and resilient means for disengaging said first and second linings in response to engagement of said first coupling means of said first clutch.

12. The apparatus of claim 1, wherein said first clutch is disposed at a first radial distance and said second clutch is disposed at a greater second radial distance from the axis of said sun wheel.

13. The apparatus of claim 1, wherein said first coupling means of said first clutch has first friction surfaces disposed at a first radial distance and said second coupling means of said second clutch has second friction surfaces disposed at a greater second radial distance from the axis of said sun wheel.

14. The apparatus of claim 1, wherein said cylinder and piston unit is hydraulically operated.

15. The apparatus of claim 1, wherein said cylinder and piston unit is disposed at a first radial distance and at least one of said clutches is disposed at a lesser second radial distance from the axis of said sun wheel.

16. The apparatus of claim 15, wherein said second coupling means of said second clutch includes friction surfaces disposed at a third radial distance from said axis of said sun wheel, said third distance at least approximating said first distance.

17. The apparatus of claim 1, wherein said unit includes a cylinder rigid with said housing, a piston reciprocable in said cylinder between first and second positions, and means for biasing said piston to one of said positions.

18. The apparatus of claim 17, wherein said means for biasing comprises at least one coil spring.

19. The apparatus of claim 1, wherein said input/output element is rotatable in first and second directions and said first coupling means of said first clutch is engageable to transmit torque between said input/output element and said carrier to rotate said element in said first direction.

20. The apparatus of claim 19, further comprising means for transmitting torque between said carrier and said internal wheel while said input/output element is rotated in said first direction.

21. The apparatus of claim 1, wherein said input/output element is rotatable in first and second directions and said second coupling means of said second clutch is engaged when said element is rotated in said second direction.

22. The apparatus of claim 21, further comprising means for transmitting torque between said carrier and said sun wheel when said input/output element is rotated in said second direction.

23. The apparatus of claim 1, wherein said apparatus is devoid of idling positions.

24. The apparatus of claim 1 in combination with a motor vehicle, wherein said input/output element is rotatable in a first direction to drive said vehicle in a forward direction and in a second direction to drive said vehicle in a rearward direction, said vehicle having a prime mover which drives said internal wheel by way of said carrier.

25. The apparatus of claim 1, wherein said cylinder and piston unit comprises a cylinder rigid with said housing and a piston mounted in and movable relative to said cylinder in response to the admission of a hydraulic fluid into said cylinder by way of said housing.

26. The apparatus of claim 1, wherein said biasing means comprises a mechanical energy storing element.

27. A power train for use in a motor vehicle, comprising:
a start-up component;
an infinitely variable transmission including two sheaves and an endless flexible element trained over said sheaves;
at least one output element;
a reversible torque transmitting apparatus including
at least one planetary having a rotary sun wheel,
an internal wheel coaxial with said sun wheel,
at least one planet wheel in mesh with at least one of said sun and internal wheels, and
a rotary carrier mounting said at least one planet wheel and coaxial with said sun wheel;
a rotary input/output element;
a first clutch including first coupling means for coupling said carrier with said input/output element, said first coupling means having engaged and disengaged conditions in which said first clutch respectively transmits torque between said input/output element and said carrier, and permits said input/output element and said carrier to rotate relative to each other;
means for yieldably biasing said first coupling means to said engaged condition;
a housing at least partially surrounding said planetary;
a fluid-operated second clutch including second coupling means for coupling said internal wheel with said housing, said second coupling means of said second clutch having engaged and disengaged conditions in which said second clutch respectively tends to transmit torque between said internal wheel and said housing, and permits said internal wheel to rotate relative to said housing; and
a single piston for operating said first and second clutches, said piston constituting part of a cylinder and piston unit which is common to said first and second clutches and is non-rotatable relative to said housing.

28. The power train of claim 27, wherein said start-up component comprises a friction clutch.

29. The power train of claim 28, wherein said friction clutch is a disc clutch.

30. The power train of claim 27, wherein said start-up component comprises a hydrodynamic clutch.

31. The power train of claim 30, wherein said hydrodynamic clutch includes a torque converter.

32. The power train of claim 30, further comprising a lock-up clutch for said hydrodynamic clutch.

33. A motor vehicle comprising:
a start-up component;
an infinitely variable transmission including two sheaves and an endless flexible element trained over said sheaves;
at least one output element;
a reversible torque transmitting apparatus including at least one planetary having a rotary sun wheel, an internal wheel coaxial with said sun wheel, at least one planet wheel in mesh with at least one of said sun wheel and said internal wheel, and a rotary carrier mounting said at least one planet wheel and coaxial with said sun wheel;
a rotary input/output element;
a first clutch including first coupling means for coupling said carrier with said input/output element, said first coupling means having engaged and disengaged conditions in which said first clutch respectively transmits torque between said input/output element and said carrier, and permits said input/output element and said carrier to rotate relative to each other;

biasing means for yieldably biasing said first coupling means to said engaged condition;

a housing at least partially surrounding said planetary;

a fluid-operated second clutch including second coupling means for coupling said internal wheel with said housing, said second coupling means of said second clutch having engaged and disengaged conditions in which said second clutch respectively tends to transmit torque between said internal wheel and said housing, and permits said internal wheel to rotate relative to said housing; and a single piston for operating said first and second clutches, said piston constituting part of a cylinder and piston unit which is common to said first and second clutches and is non-rotatable relative to said housing.

34. An apparatus comprising:

coaxial first and second clutches, said first clutch constituting a disc clutch and including an axially fixed input component constituting a planet wheel carrier of a planetary for use as a means for reversing the direction of advancement of a motor vehicle having an engine, and said first clutch further including an axially fixed rotary output component, a first disc-shaped member axially movably installed between said components, a diaphragm spring having a first portion arranged to move said first member axially, and discs arranged to establish a torque-transmitting connection between said components in response to axial movement of said first member under the bias of said spring, said second clutch constituting a brake including a second disc-shaped member arranged to connect an internal wheel of said planetary with a housing at least partially surrounding said brake so that the internal wheel is held against rotation relative to the housing and against axial movement at least in the direction of the bias of said spring upon said first member, said spring further having a second portion bearing against said second member, said internal gear and said first clutch and said second member together constituting an assembly which is stressed by said spring and is movable in the direction of the common axis of said first and second clutches, said first clutch of said assembly being engaged and said internal wheel of said assembly bearing against an axially movable portion of said first clutch, said spring being disposed between said members as seen in the direction of said common axis and each of said members having a friction surface facing away from said spring, the friction surface of said first member confronting a friction surface of a piston which is reciprocable in the direction of said common axis and the friction surface of said second member confronting and being spaced apart from a friction surface of said housing, said piston being movable toward the friction surface of said housing in one direction of said common axis to thereby reduce the distance of the friction surface of said second member from the friction surface of said housing against the opposition of said spring until the friction surface of said second member engages the friction surface of said housing, and said piston being thereafter movable in said one direction against the opposition of said spring to thereby move said first member away from said discs with attendant disengagement of said first clutch;

a start-up clutch connecting said first clutch with said engine; and a variable-speed transmission connected with said output component.

35. The apparatus of claim 34, wherein said piston is movable against the opposition of said spring to a position in which the second clutch is acted upon exclusively by a hydraulic fluid.

36. A torque transmitting apparatus comprising:

at least one planetary including a rotary sun wheel, an internal wheel coaxial with said sun wheel, at least one planet wheel in mesh with at least one of said sun and internal wheels, and a rotary carrier mounting said at least one planet wheel and coaxial with said sun wheel;

a rotary input/output element;

a first clutch including first coupling means for coupling said carrier with said input/output element, said first coupling means having engaged and disengaged conditions in which said first clutch respectively transmits torque between said input/output element and said carrier, and permits said input/output element and said carrier to rotate relative to each other;

biasing means for yieldably biasing said first coupling means in said engaged condition;

a housing at least partially surrounding said planetary; and a fluid-operated second clutch including second coupling means for coupling said internal wheel with said housing, said second coupling means of said second clutch having engaged and disengaged conditions in which said second clutch respectively transmits torque between said internal wheel and said housing, and permits said internal wheel to rotate relative to said housing, said second clutch being a friction clutch, and said second coupling means of said second clutch including two substantially disc-shaped members and a friction lining on at least one of said members, said disc-shaped members having a common axis, and said biasing means being disposed between said members in the direction of said common axis.

37. The apparatus of claim 36, wherein said biasing means comprises a diaphragm spring.

38. The apparatus of claim 36, wherein one of said disc-shaped members includes means for transmitting bias from said biasing means to said coupling means of said first clutch.

39. The apparatus of claim 38, wherein said means for transmitting bias comprises a radially inner portion of said one disc-shaped member.

40. The apparatus of claim 38, further comprising means for axially movably and non-rotatably securing at least one of said disc-shaped members to said internal wheel.

41. A torque transmitting apparatus comprising:

at least one planetary including a rotary sun wheel, an internal wheel coaxial with said sun wheel, at least one planet wheel in mesh with at least one of said sun and internal wheels, and a rotary carrier mounting said at least one planet wheel and coaxial with said sun wheel;

a rotary input/output element;

a first clutch including first coupling means for coupling said carrier with said input/output element, said first coupling means having engaged and disengaged conditions in which said first clutch respectively transmits torque between said input/output element and said carrier, and permits said input/output element and said carrier to rotate relative to each other;

biasing means for yieldably biasing said first coupling means in said engaged condition;

a housing at least partially surrounding said planetary; and a fluid-operated second clutch including second coupling means for coupling said internal wheel with said housing, said second coupling means of said second clutch having engaged and disengaged conditions in which said second clutch respectively transmits torque between said internal wheel and said housing, and permits said internal wheel to rotate relative to said housing, said second clutch including two substantially disc-shaped members having a common axis, and said members, said biasing means and said internal wheel forming at least part of an assembly which is movable relative to said housing in the direction of said common axis.

42. A torque transmitting apparatus comprising:

at least one planetary including a rotary sun wheel, an internal wheel coaxial with said sun wheel, at least one planet wheel in mesh with at least one of said sun and internal wheels, and a rotary carrier mounting said at least one planet wheel and coaxial with said sun wheel, said internal wheel being movable in the direction of the common axis of said sun wheel and said internal wheel between two end positions;

a rotary input/output element;

a first clutch including first coupling means for coupling said carrier with said input/output element, said first coupling means having engaged and disengaged conditions in which said first clutch respectively transmits torque between said input/output element and said carrier, and permits said input/output element and said carrier to rotate relative to each other;

biasing means for yieldably biasing said first coupling means in said engaged condition;

a housing at least partially surrounding said planetary;

a fluid-operated second clutch including second coupling means for coupling said internal wheel with said housing, said second coupling means of said second clutch having engaged and disengaged conditions in which said second clutch respectively transmits torque between said internal wheel and said housing, and permits said internal wheel to rotate relative to said housing; and means for at least substantially centering said internal wheel relative to said sun wheel in at least one of said end positions of said internal wheel.

43. The apparatus of claim 42, wherein said internal wheel has an external surface and said centering means engages said external surface in said at least one end position of said internal wheel.

44. The apparatus of claim 43, wherein said external surface includes a conical portion.

45. The apparatus of claim 42, wherein said centering means for said internal wheel includes a portion provided on said carrier.

46. The apparatus of claim 45, wherein said portion of said centering means is of one piece with said carrier.

47. The apparatus of claim 45, wherein said portion of said centering means includes a centering surface on said carrier.

48. The apparatus of claim 42, wherein said centering means includes a centering surface on said carrier and resilient means for urging said internal wheel against said centering surface.

49. The apparatus of claim 48, wherein said resilient means comprises at least one diaphragm spring.

50. The apparatus of claim 48, wherein said second coupling means of said second clutch includes two coaxial disc-shaped members and said resilient means is disposed between said members as seen in the direction of the common axis of said members.

51. The apparatus of claim 50, wherein said resilient means reacts against at least one of said disc-shaped members and urges said internal wheel against said carrier.

52. The apparatus of claim 50, wherein said input/output element is rotatable in first and second directions, and further comprising a retainer which is engaged by said resilient means at least while said input/output element rotates in one of said directions.

53. The apparatus of claim 52, wherein said retainer is connected with said carrier.

54. The apparatus of claim 52, wherein said resilient means is arranged to engage said retainer only while said input/output element rotates in one of said directions.

55. The apparatus of claim 54, wherein said resilient means reacts against each of said disc-shaped members, at least in the direction of the common axis of said members.

* * * * *